US010783250B2

(12) United States Patent
Hershman et al.

(10) Patent No.: US 10,783,250 B2
(45) Date of Patent: Sep. 22, 2020

(54) SECURED MASTER-MEDIATED TRANSACTIONS BETWEEN SLAVE DEVICES USING BUS MONITORING

(71) Applicant: NUVOTON TECHNOLOGY CORPORATION, Hsin-chu (TW)

(72) Inventors: Ziv Hershman, Givat Shmuel (IL); Dan Morav, Herzliya (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 0 days.

(21) Appl. No.: 16/377,211

(22) Filed: Apr. 7, 2019

(65) Prior Publication Data
US 2019/0236276 A1 Aug. 1, 2019

Related U.S. Application Data

(63) Continuation-in-part of application No. 14/714,298, filed on May 17, 2015, now Pat. No. 10,303,880.

(60) Provisional application No. 62/028,345, filed on Jul. 24, 2014.

(51) Int. Cl.
*G06F 21/57* (2013.01)
*G06F 13/362* (2006.01)
*G06F 21/55* (2013.01)

(52) U.S. Cl.
CPC .......... *G06F 21/57* (2013.01); *G06F 13/362* (2013.01); *G06F 21/554* (2013.01); *G06F 2221/034* (2013.01)

(58) Field of Classification Search
CPC .................................................... G06F 21/57
USPC .......................................................... 726/1
See application file for complete search history.

(56) References Cited

U.S. PATENT DOCUMENTS

| 5,696,994 | A | 12/1997 | Pang |
| 5,713,006 | A | 1/1998 | Shigeeda |
| 5,713,306 | A | 2/1998 | Johnson |
| 5,740,404 | A | 4/1998 | Baji |
| 6,049,876 | A | 4/2000 | Moughanni et al. |
| 6,088,450 | A * | 7/2000 | Davis ........................ G07C 9/28 713/182 |
| 6,289,408 | B1 | 9/2001 | Regal |

(Continued)

OTHER PUBLICATIONS

National Institute of Standards and Technology, "Implementation Guidance for FIPS 140-2 and the Cryptographic Module Validation Program", pp. 1-252, Mar. 28, 2003.

(Continued)

*Primary Examiner* — Peter C Shaw
(74) *Attorney, Agent, or Firm* — Kligler & Associates Patent Attorneys Ltd

(57) ABSTRACT

A secured device includes an interface and a processor. The interface is configured to connect to a bus, to which a host and a second device are coupled. At least the second device operates over the bus in a slave mode, and the host operates on the bus as a bus master that initiates transactions on the bus, at least on behalf of the secured device. The processor is configured to request the host to initiate, for the secured device, a transaction that accesses the second device over the bus, to monitor one or more signals on the bus, at least within a period during which the host accesses the second device over the bus in performing the requested transaction, and to identify, based on the monitored signals, whether a security violation occurred in performing the requested transaction.

29 Claims, 4 Drawing Sheets

(56) References Cited

U.S. PATENT DOCUMENTS

| | | |
|---|---|---|
| 6,510,522 B1 | 1/2003 | Heinrich et al. |
| 6,832,317 B1 | 12/2004 | Strongin et al. |
| 7,065,654 B1 | 6/2006 | Gulick et al. |
| 7,155,615 B1 | 12/2006 | Silvester |
| 7,205,883 B2 * | 4/2007 | Bailey .................... G06F 21/34 235/375 |
| 7,496,929 B2 | 2/2009 | Dunstan |
| 7,664,836 B2 | 2/2010 | Kim |
| 7,797,115 B2 | 9/2010 | Tasher et al. |
| 8,782,434 B1 * | 7/2014 | Ghose .................. G06F 9/3851 713/190 |
| 9,158,628 B2 | 10/2015 | Maity et al. |
| 9,239,925 B2 | 1/2016 | Cumming et al. |
| 9,432,298 B1 | 8/2016 | Smith |
| 10,095,891 B2 | 10/2018 | Hershman et al. |
| 10,303,880 B2 | 5/2019 | Hershman et al. |
| 2002/0087872 A1 | 7/2002 | Wells et al. |
| 2003/0061494 A1 | 3/2003 | Girard et al. |
| 2004/0081079 A1 | 4/2004 | Forest et al. |
| 2004/0255071 A1 | 12/2004 | Larson et al. |
| 2004/0268138 A1 | 12/2004 | Larson et al. |
| 2005/0021968 A1 | 1/2005 | Zimmer et al. |
| 2005/0132186 A1 | 6/2005 | Khan et al. |
| 2005/0204162 A1 | 9/2005 | Rayes et al. |
| 2006/0059360 A1 * | 3/2006 | Ortkiese .................. F24C 7/08 713/183 |
| 2006/0107032 A1 | 5/2006 | Paaske et al. |
| 2007/0109015 A1 | 5/2007 | Hanes et al. |
| 2008/0177994 A1 | 7/2008 | Mayer |
| 2008/0276302 A1 | 11/2008 | Touboul |
| 2008/0282017 A1 | 11/2008 | Carpenter et al. |
| 2010/0037321 A1 | 2/2010 | Oz et al. |
| 2012/0163589 A1 | 6/2012 | Johnson et al. |
| 2012/0210115 A1 | 8/2012 | Park et al. |
| 2012/0255012 A1 | 10/2012 | Sallam |
| 2012/0255014 A1 | 10/2012 | Sallam |
| 2013/0166975 A1 | 6/2013 | Son et al. |
| 2013/0254906 A1 | 9/2013 | Kessler et al. |
| 2013/0312099 A1 | 11/2013 | Edwards et al. |
| 2015/0026426 A1 | 1/2015 | Sahita et al. |
| 2016/0188909 A1 | 6/2016 | Zatko et al. |
| 2017/0206034 A1 | 7/2017 | Fetik |
| 2017/0364700 A1 | 12/2017 | Goldfarb et al. |
| 2018/0239727 A1 | 8/2018 | Hershman et al. |
| 2019/0236278 A1 | 8/2019 | Martinez et al. |

OTHER PUBLICATIONS

National Institute of Standards and Technology, "Security Requirements for Cryptographic Modules", FIPS PUB 140-2, pp. 1-69, May 25, 2001.

National Institute of Standards and Technology, "Secure Hash Standard (SHS)", FIPS PUB 180-4, pp. 1-36, Aug. 2015.

National Institute of Standards and Technology, "The Keyed-Hash Message Authentication Code (HMAC)", FIPS PUB 198-1, pp. 1-13, Jul. 2008.

Unified EFI Forum, Inc., "Unified Extensible Firmware Interface (UEFI) Specification", version 2.7, errata A, pp. 1-41 (chapter 8.2—pp. 237-259, chapter 23.1—pp. 1001-1016), Aug. 2017.

Unified EFI Forum, Inc., "Unified Extensible Firmware Interface (UEFI) Specification", version 2.7, errata A, pp. 1-36 (chapter 31—pp. 1697-1730), Aug. 2017.

U.S. Appl. No. 16/377,212 office action dated Oct. 18, 2019.

WINBOND-SPIFLASH, "3V 256M-BIT, Serial Flash Memory With Dual/Quad SPI & QPI", pp. 1-104, Nov. 13, 2015.

NXP Semiconductors "UM10204—I2C-bus specification and user manual", Revision 6 , pp. 1-65, Apr. 4, 2014.

TCG Software Stack (TSS) Specification Version 1.2, Level 1, Errata A, Part 1: Commands and Structures, pp. 1-757, Mar. 7, 2007.

TCG PC Client Specific Implementation Specification for Conventional BIOS, Specification Version 1.21 Errata, Revision 1.00, pp. 1-151, Feb. 24, 2012.

TCG PC Client Specific TPM Interface Specification (TIS), Specification Version 1.3, pp. 1-112, Mar. 21, 2013.

TPM Main Specification, "Part 1—Design Principles", version 1.2, Revision 116, pp. 1-184, Mar. 1, 2011.

TPM Main Specification, "Part 2—Structures", version 1.2, Level 2, Revision 116, pp. 1-201, Mar. 1, 2011.

TPM Main Specification, "Part 3—Commands", version 1.2, Level 2, Revision 116, pp. 1-339, Mar. 1, 2011.

Hershman et al., U.S. Appl. No. 16/377,212, filed Apr. 7, 2019.

U.S. Appl. No. 16/568,299 office action dated Apr. 29, 2020.

* cited by examiner

SECURED MASTER-MEDIATED TRANSACTIONS BETWEEN SLAVE DEVICES USING BUS MONITORING

CROSS-REFERENCE TO RELATED APPLICATIONS

This application is a Continuation-In-Part (CIP) of U.S. patent application Ser. No. 14/714,298, filed May 17, 2015, which claims the benefit of U.S. Provisional Patent Application 62/028,345, filed Jul. 24, 2014. The disclosures of these related applications are incorporated herein by reference. This application is related to a U.S. patent application Ser. No. 16/377,212 entitled "Secure System Boot Monitor," filed on even date. The disclosures of these related applications are incorporated herein by reference.

TECHNICAL FIELD

Embodiments described herein relate generally to electronic-system security, and particularly to methods and systems for securing transactions between peripheral devices.

BACKGROUND

Electronics systems use various types of bus interfaces for communicating between host devices and peripheral devices. Examples of bus interfaces include the Inter-Integrated-Circuit $I^2C$ bus and the Serial Peripheral Interface (SPI) bus. The $I^2C$ bus is specified, for example, in "$I^2C$ bus specification and user manual," UM10204, NXP Semiconductors, revision 6, Apr. 4, 2014, which is incorporated herein by reference.

SUMMARY

An embodiment that is described herein provides a secured device that includes an interface and a processor. The interface is configured to connect to a bus, to which a host and a second device are coupled. At least the second device operates over the bus in a slave mode, and the host operates on the bus as a bus master that initiates transactions on the bus, at least on behalf of the secured device. The processor is configured to request the host to initiate, for the secured device, a transaction that accesses the second device over the bus, to monitor one or more signals on the bus, at least within a period during which the host accesses the second device over the bus in performing the requested transaction, and to identify, based on the monitored signals, whether a security violation occurred in performing the requested transaction.

In an embodiment, the processor is configured to operate on the bus in a slave mode. In another embodiment, the secured device is additionally coupled to the host via another bus different from the bus, and the processor is configured to request the host, via the another bus, to initiate the transaction.

In some embodiments, the requested transaction includes one of: (i) reading data from the second device, (ii) writing data to the second device, and (iii) transferring data between first and second addresses in the second device. In other embodiments, the requested transaction specifies intended transaction information, and the processor is configured to monitor, on the bus, actual transaction information corresponding to the requested transaction, and to identify the security violation, by detecting that at least part of the intended transaction information differs from the actual transaction information. In yet other embodiments, the processor is configured to detect that at least one element selected from a list including an opcode element, an address element and a data element, is different between the intended transaction information and the actual transaction information.

In an embodiment, the processor is configured to identify the security violation by detecting that a predefined security policy has been violated on the bus, during or outside the period of the requested transaction. In another embodiment, the requested transaction includes reading data from the second device, and the processor is configured to snoop on the bus, data read from the second device, by the host, over the bus. In yet another embodiment, the processor is configured to request the host to initiate a first write operation to the second device, and to apply a second different write operation to the second device, by overriding logical values of one or more signals on the bus during execution of the first write operation by the host.

In some embodiments, the processor is configured to request the host to initiate a first read operation to the second device, and to apply a second different read operation to the second device, by overriding logical values of one or more signals on the bus during execution of the first read operation by the host. In other embodiments, the processor is configured to request the host to initiate a transaction that accesses the second device over the bus, to disconnect a signal of the bus connecting between the host and the second device, and to access the second device over the bus, instead of the host. In yet other embodiments, in response to identifying the security violation, the processor is configured to perform a protective action that prevents exposing or modifying data that appears on the bus in accessing the second device.

In an embodiment, both the secured device and the second device are implemented in a common package, and are interconnected via the bus within the common package.

There is additionally provided, in accordance with an embodiment that is described herein, a method, including, in a secured device that connects to a bus to which a host and a second device are coupled, at least the second device operates over the bus in a slave mode, and the host operates on the bus as a bus master that initiates transactions on the bus, at least on behalf of the secured device, requesting the host, by the secured device, to initiate for the secured device a transaction that accesses the second device over the bus. One or more signals are monitored on the bus, at least within a period during which the host accesses the second device over the bus in performing the requested transaction. Based on the monitored signals, a decision of whether a security violation occurred in performing the requested transaction is made.

There is additionally provided, in accordance with an embodiment that is described herein, a secured system that includes a host and a secured device. The host is coupled to a bus, and is configured to operate as a bus master, and to access slave devices coupled to the bus by arbitrating between bus access operations triggered by the slave devices and by the host. The secured device is coupled to the bus, and is configured to request the host to initiate a transaction that accesses a second device coupled to the bus as a slave, to monitor one or more signals on the bus, at least within a period during which the host accesses the second device over the bus in performing the requested transaction, and to identify, based on the monitored signals, whether a security violation occurred in performing the requested transaction.

In an embodiment, the secured device is configured to operate on the bus in a slave mode. In another embodiment, the secured device is additionally coupled to the host via another bus different from the bus, and the secured device is configured to request the host, via the another bus, to initiate the transaction.

In some embodiments, the requested transaction specifies intended transaction information, and the secured device is configured to monitor, on the bus, actual transaction information corresponding to the requested transaction, and to identify the security violation, by detecting that at least part of the intended transaction information differs from the actual transaction information. In other embodiments, the requested transaction includes reading data from the second device, and the secured device is configured to snoop on the bus, data read from the second device, by the host, over the bus. In yet other embodiments, the secured device is configured to request the host to initiate a first write operation to the second device, and to apply a second different write operation to the second device, by overriding logical values of one or more signals on the bus during execution of the first write operation by the host.

In an embodiment, the secured device is configured to request the host to initiate a first read operation to the second device, and to apply a second different read operation to the second device, by overriding logical values of one or more signals on the bus during execution of the first read operation by the host. In another embodiment, the secured device is configured to request the host to initiate a transaction that accesses the second device over the bus, to disconnect a signal of the bus connecting between the host and the second device, and to access the second device over the bus, instead of the host. In yet another embodiment, in response to identifying the security violation, the secured device is configured to perform a protective action that prevents exposing or modifying data that appears on the bus in accessing the second device.

There is additionally provided, in accordance with an embodiment that is described herein, a method, including, in a secured system that includes a host operating as a bus master on a bus to which coupled slave devices, arbitrating by the host between bus access operations triggered by the slave devices and by the host. The host is requested, by a secured device coupled to the bus, to initiate a transaction that accesses a second device coupled to the bus as a slave. One or more signals are monitored on the bus, by the secured device, at least within a period during which the host accesses the second device over the bus in performing the requested transaction. Based on the monitored signals, a decision is made, by the secured device, of whether a security violation occurred in performing the requested transaction.

There is additionally provided, in accordance with an embodiment that is described herein, a security apparatus that includes a security device, and a dedicated device driver running on a host. The security device provides a security service to the host. The security device, the host, and a Non-Volatile Memory (NVM) device external to the security device are coupled to a common bus. The dedicated device driver is configured to mediate between the security device and the NVM device. The security device is configured to receive a security command from an application program running on the host, and to execute the security command by accessing the NVM device, over the bus, transparently to the application program via the dedicated device driver.

These and other embodiments will be more fully understood from the following detailed description of the embodiments thereof, taken together with the drawings in which:

DETAILED DESCRIPTION OF EMBODIMENTS

Overview

Figure 1:
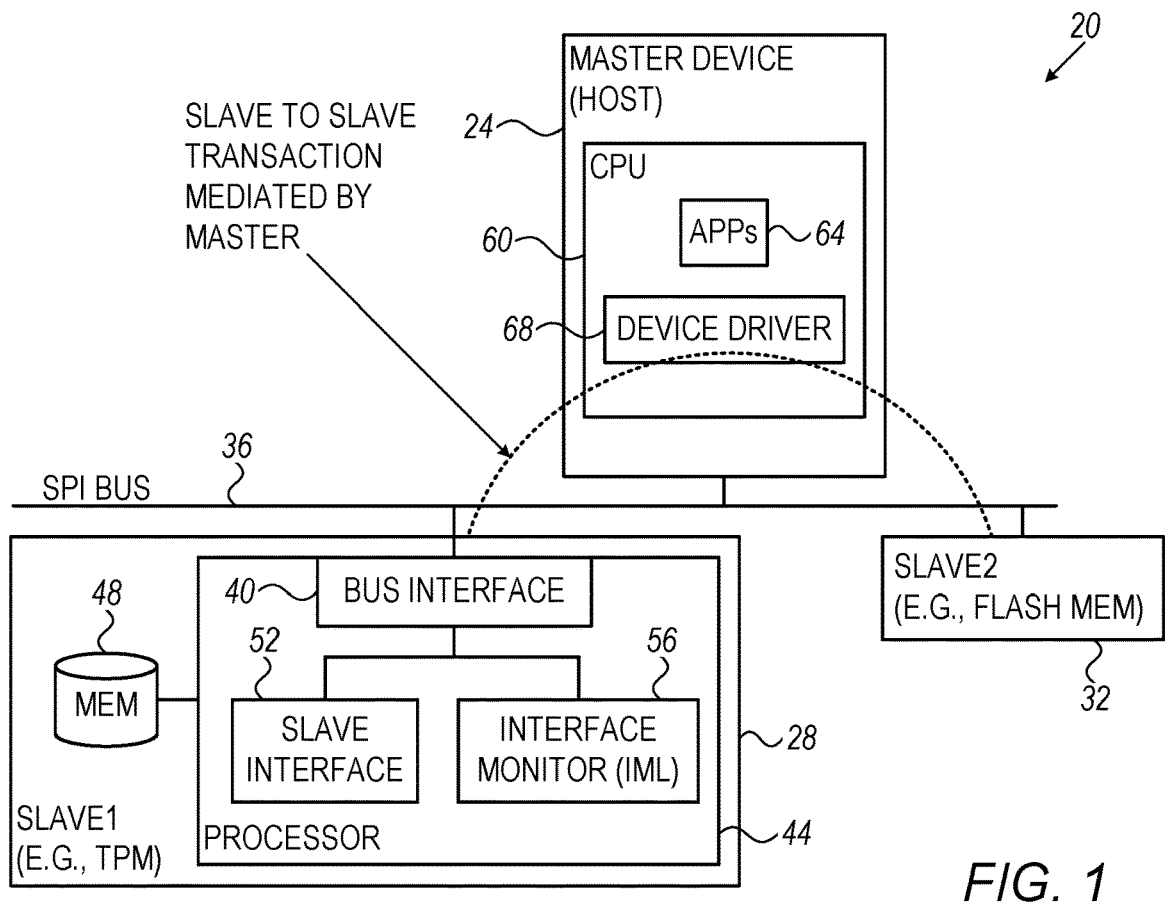
FIG. 1 is a block diagram that schematically illustrates a secured system, in accordance with an embodiment that is described herein.

In master-slave configurations, a host device operating as a bus master is typically coupled to multiple slave devices over a bus. The host, as a bus master, is allowed to initiate transactions on the bus, but the slave devices may access the bus only by responding to the host. In some practical scenarios, however, it is desirable that one slave device be able to initiate and execute a transaction with another slave device.

Embodiments that are described herein provide systems and methods for performing and securing master-mediated transactions between slave devices, using bus monitoring. The device that monitors the bus may be coupled to the host via an additional different bus, and request transactions from the host over that additional bus.

In some embodiments, the host runs one or more applications that may require accessing the bus, and a device driver that mediates transactions on the bus, on behalf of the slave devices. The host arbitrates between the device driver and the other applications attempting to access the bus.

In some embodiments, a first device (e.g., slave TPM or other security processor) needs to perform a transaction in a second device (e.g., a slave Flash memory). To this end, the first device requests the device driver in the host, to initiate a transaction on the bus for accessing the second device on its behalf, e.g., using interrupt or polling notification flag techniques. The first device monitors the transaction executed on its behalf by the host on the bus, to ensure that the transaction is executed correctly, e.g., that the host is not compromised.

In some embodiments, the first device may monitor the bus not only for verifying requested transactions as described above, but also for verifying that no security policy (e.g., predefined) has been violated on the bus, for example, by an attacker that has access to the host.

The first device may monitor one or more signals on the bus, at least within a period during which the host accesses the second device over the bus in performing the requested transaction. The first device identifies, based on the monitored signals, whether a security violation occurred in performing the requested transaction. When detecting a security violation, the first device may perform a protective action, e.g., an action that prevents exposing data that appears on the bus, e.g., in accessing the second device. In an embodiment, selecting the protective action may be based on a predefined policy.

The first device may request the host to initiate any suitable transaction, such as, for example, (i) reading data from the second device, (ii) writing data to the second device, or (iii) transferring data between different addresses in the second device. The data read from or written to the second device may be encrypted and/or signed.

The first device may identify the security violation by detecting that at least part of the intended transaction information specified in the requested transaction differs from the actual transaction information monitored on the bus. Such a mismatch may occur in at least one transaction element, such as an opcode or command-type element, an address element and/or a data element of the transaction. In some embodiments, the first device may identify a security violation in response to detecting that a predefined security policy has been violated on the bus (e.g., a protected address has been accessed,) during or outside the period of the requested transaction.

In an embodiment, the requested transaction comprises reading data from the second device, and the first device monitors the bus, to snoop the data read from the second device by the host over the bus. In another embodiment, the first device requests the host to initiate a dummy write (or dummy read) operation to the second device. The first device then applies a different write (or read) operation to the second device, by overriding logical values of one or more signals on the bus during execution of the dummy write (or dummy read) operation by the host. In yet other embodiments, during the execution of a requested transaction by the host, the first device disconnects a signal of the bus connecting between the host and the second device, and accesses the second device over the bus, instead of the host.

In an example configuration, the secured system comprises a slave security device and a slave NVM device. To provide a security service to the host, the security device requires access the NVM device that resides externally to the security device. The host runs a dedicated device driver that mediates between the security device and the NVM device. The security device receives a security command from an application program running on the host, and executes the security command by accessing the NVM device, over the bus, transparently to the application program via the dedicated device driver.

In the disclosed techniques, the host operates as a bus master, and shares a bus with one or more slave devices by running a device driver that mediates transactions on the bus. A monitoring device monitors the bus to detect security violation. The monitoring device is coupled to the bus for monitoring and controlling signals on the bus, and may request the host to initiate transactions on the bus, as a slave device.

Alternatively, the monitoring device is additionally coupled to the host over a different bus for requesting the host to initiate transactions on the bus. By monitoring the bus, the monitoring device is able to snoop a transaction on the bus and/or even to override or replace a transaction on the bus with a desired transaction that is hidden from the host.

System Description

FIG. 1 is a block diagram that schematically illustrates a secured system 20, in accordance with an embodiment that is described herein. In the present example, secured system 20 comprises a master host device that connects to peripheral slave devices 28 and 32 using a bus 36. Slave devices 28 and 32 are denoted SLAVE1 and SLAVE2, respectively. In the present example, bus 36 comprises the Serial Peripheral Interface (SPI) bus. In other embodiments bus 36 may comprise any other suitable bus, e.g., the Low Pin Count bus (LPC), or the Inter-Integrated Circuit ($I^2C$) bus. An $I^2C$ bus can be used, for example, for connecting to an Electrically Erasable Read-Only Memory (EEPROM) device. Other bus interfaces to a solid-state storage device may comprise, for example, the Secure Digital (SD) interface, the Multi-Media-Card (MMC) interface or a parallel Flash interface. The host device is also referred to simply as a "host" for brevity.

In some embodiments, SLAVE1 is a slave device of the host over bus 36, and additionally monitors and controls bus signals of bus 36. In alternative embodiments, SLAVE1 is coupled to bus 36 for monitoring and controlling bus signals, but is coupled to the host, possibly as a slave device, over another bus (not shown), such as, for example, the $I^2C$ bus.

In the master-slave configuration of secured system 20, only host 24 is allowed to initiate a read or write transaction over bus 36. On the other hand, each of the slave devices may access bus 36 only in response to a request from host 24. In this master-slave configuration, SLAVE1 and SLAVE2 cannot communicate directly with one another over bus 36, but require that their communication is mediated by the host. Such mediation is required for SLAVE1 being a slave over bus 36 as well as for SLAVE1 being coupled to the host over another bus.

SLAVE1 and SLAVE2 may comprise any suitable type of devices. In one configuration, SLAVE1 may comprise a security device also sometimes referred to as a Trusted Platform Module (TPM), whereas SLAVE2 may comprise a Nonvolatile Memory (NVM). Other suitable configurations of slave devices 28 and 32 can also be used. In general, SLAVE1 may comprise any suitable controller such as an Embedded Controller (EC). In an example embodiment, SLAVE2 may comprise a NVM of any suitable type such as, for example, a Read Only Memory (ROM), a One-Time Programmable (OTP) memory, an EEPROM or a Flash memory. Alternatively, SLAVE2 may comprise a volatile memory such as a Random Access Memory (RAM) device.

Note that a system configuration in which one of the slave devices comprises a memory device is not mandatory. In some embodiments, SLAVE1 and SLAVE2 comprise controllers that may need to exchange information with one another via the host, while monitoring the bus.

In the present example, SLAVE1 comprises a bus interface 40 for connecting to bus 36, a processor 44 that is configured to carry out the disclosed techniques, and a memory 48 that is configured to store one or more security policies enforced by processor 44. Processor 44 comprises slave interface logic 52 and Interface Monitor Logic (IML) 56. Slave interface logic 52 handles the communication between SLAVE1 and host 24. IML 56 monitors, controls and selectively overrides the bus signals when host 24 accesses SLAVE2 on behalf of SLAVE'. In some embodiments, IML 56 monitors the bus for verifying correct execution of transactions requested from the host by SLAVE'. In an embodiment, IML 56 additionally monitors the bus for detecting possible violation of one or more predefined security policies that are not related to specific requested transactions and that may be stored in memory 48.

In secured system 20, SLAVE1 protects the access to SLAVE2, e.g., using IML 56, by monitoring the transactions on bus 36 and preventing unauthorized transactions in which host 24, or another device having bus-master capabilities, attempts to access SLAVE2 without authorization. In some embodiments, IML 56 of SLAVE1 monitors bus 36 to intercept a transaction requested by SLAVE1 actually being executed by the host, and to verify that the transaction is executed correctly. In response to detecting a violation on the bus, e.g., during the execution of the requested transaction by the host, IML 56 may apply a suitable protective action.

In some embodiments, the protective action is used to prevent undesirable leakage, or exposure of secret information that may be exposed to bus 36 during the transaction. In some embodiments, the protective action prevents data corruption on the bus or to prevent data corruption to data stored in SLAVE2, such as an unauthorized attempt to modify setup or configuration information stored in SLAVE2.

Host 24 comprises a CPU 60 running one or more application programs 64, and a dedicated device driver 68. In some embodiments, SLAVE1 comprises a security device that provides host 24, together with the dedicated device driver, with functionalities required for implementing trusted computing and other security policies. CPU 60 arbitrates between various programs or processes that the CPU runs and that may require access to bus 36, such as applications 64 and dedicated device driver 68. Application 64 may comprise, for example, a security application that provides secure storage services, e.g., controlled access of system resources to stored information.

Dedicated device driver 68 mediates the communication between SLAVE1 and SLAVE2. For example, device driver 68 provides SLAVE1 with indirect access to SLAVE2, transparently to applications 64. When performing an internal task or calculation, SLAVE1 may require access to SLAVE2, for example, for reading data from or writing data to SLAVE2. SLAVE1 may require access to SLAVE2 independently of applications 64 running on host 24. Alternatively, SLAVE1 requires access to SLAVE2 for fulfilling a command originating by application 64.

SLAVE1 may request from device driver 68 to access SLAVE2 in various ways. In one embodiment, SLAVE1 prepares the request internally, e.g., in a predefined register, and generates an interrupt signal to notify the device driver to read the request via bus 36. In another embodiment, the device driver (68) polls a register within SLAVE1 to identify whether there is a pending request. In yet another embodiment, device driver 68 checks the register value in SLAVE1 conditionally, for example, in response to application 64 sending a command (e.g., a security command) to the slave device.

When device driver 68 receives from SLAVE1 a request to access SLAVE2, the CPU arbitrates between device driver 68 and other applications (64) and accesses SLAVE2 over bus 36 on behalf of SLAVE'. For example, when SLAVE2 comprises a NVM or other memory, SLAVE1 may request device driver 68 to access bus 36 for executing a transaction such as (i) read data from a given NVM address, (ii) write data to a given NVM address, and (iii) copy data from one NVM address to another NVM address.

Security Methods Using Bus Monitoring

Secured system 20 may be compromised by an unauthorized attacker, e.g., tampering with host 24. The attacker may, for example, detect a transaction requested by SLAVE1 from the host, and cause the host to apply to SLAVE2 a transaction different from the requested transaction, e.g., for exposing secret information or performing unauthorized data modification, e.g., to information stored in SLAVE2. By monitoring bus 36, SLAVE1 can detect violation events on the bus and take protective actions, accordingly.

In describing the embodiments below, a transaction executed by host 24 with SLAVE2 is assumed to appear on the bus as a sequence of logical values. The sequence corresponding to a given transaction typically comprises an address part and a data part, i.e., [address, data]. The sequence of logical values may also include an opcode that identifies the type of transaction, in which case the sequence may appear on the bus as [opcode, address, data]. In this example, when SLAVE1 intercepts the opcode part, it can modify (e.g., override the logical values of) the address part, data part, or both. The opcode, address and data parts of a transaction are also referred to herein collectively as "transaction information."

Figure 2:
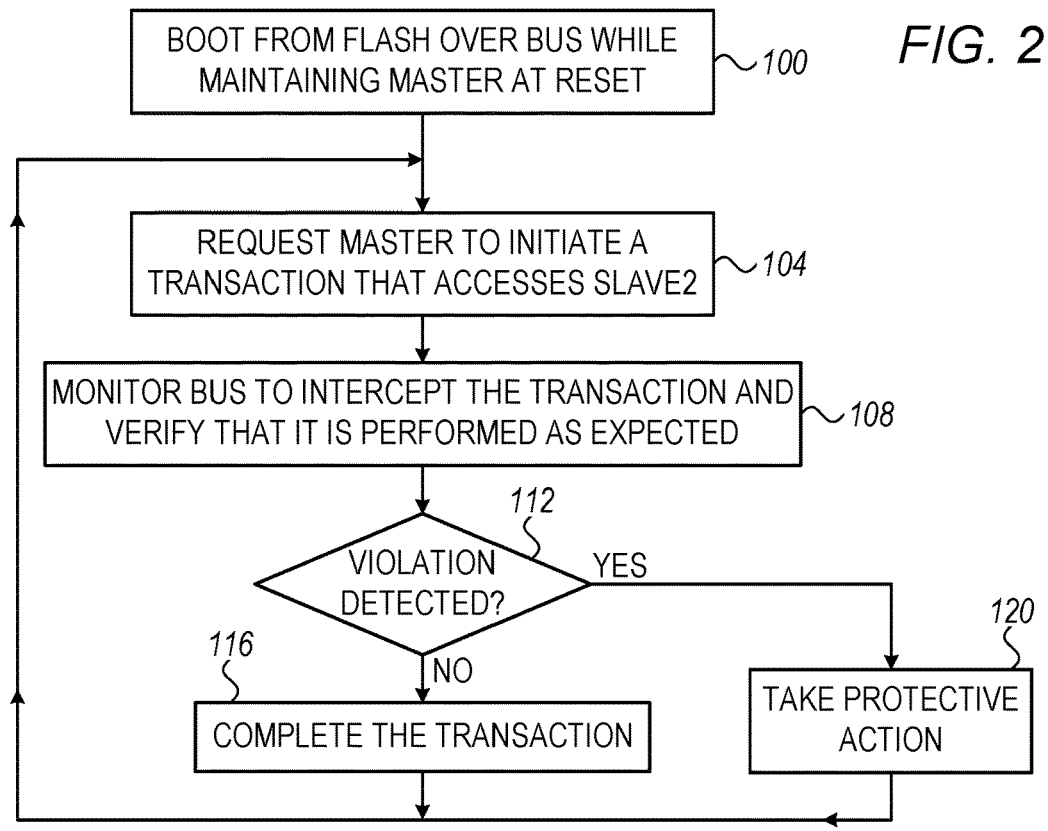
FIG. 2 is a flow chart that schematically illustrates a method for securing master-mediated transactions based on bus monitoring, in accordance with an embodiment that is described herein.

FIG. 2 is a flow chart that schematically illustrates a method for securing master-mediated transactions based on bus monitoring, in accordance with an embodiment that is described herein. The method may be executed, for example, by processor 44 of slave device 28 of FIG. 1. In describing the method, as a non-limiting example, slave device 28 (SLAVE1) comprises a security device, and slave device 32 (SLAVE2) comprises a Flash memory, e.g., a SPI Flash memory—when bus 36 comprises the SPI bus.

The method begins with processor 44 (of SLAVE1) booting from the Flash memory at a reset holding step 100. In an embodiment, processor 44 comprises a suitable interface and circuitry (not shown) to maintain host 24 at reset while accessing to the Flash memory, typically as part of the system boot process. In an embodiment, to load the booting program, processor 44 loads a data block from the Flash memory, verifies the authenticity of the data block and stores the authenticated data block locally in memory 48. The booting mechanism described above, which maintains the host at reset is not mandatory. In alternative embodiments, other suitable booting methods can also be used.

At a transaction requesting step 104, processor 44 requests device driver 68 of host 24 to initiate a transaction that involves accessing the Flash memory over bus 36. The requested transaction may comprise, for example, (i) reading data from a given Flash address, (ii) writing data to a given Flash address, or (iii) copying data from one Flash address to another different Flash address.

At a monitoring step 108, processor 44 monitors bus 36 using IML 56 to intercept the requested transaction on the bus, for verifying that the transaction is executed as intended. For example, in case of a write transaction—verify that data specified in the transaction is indeed written to the address specified in the transaction. The IML monitors one or more bus signals such as Chip-Select (CS) signals, clock signal, and bus signals that carry data and address information. When bus 36 comprises the SPI bus, the IML 56 may monitor data and address information over the Master-Out Slave-In (MOSI) signal, the Master-In Slave-Out (MISO) signal of the SPI bus, or both.

At step 108, processor 44 may intercept the requested transaction on the bus in various ways, e.g., based on information in the requested transaction or other information that is known to the processor. Note that between the time of requesting the transaction and the time of actual execution of the requested transaction by the device driver, the host may initiate other transactions on the bus, originating by applications 64, which transaction processor 44 typically ignores. In an example embodiment, in case of a read, write or copy transaction, processor 44 intercepts address information specified in the requested transaction. In case of a write transaction, the processor may intercept the data to be written (or part of this data).

Further at step 108, in response to intercepting the requested transaction (or part of the transaction) on the bus, the processor monitors the bus (using the IML) to verify that the requested transaction is performed as intended. For example, the processor verifies that the host accesses the Flash memory, over bus 36, at the address or address-range specified in the requested transaction. In write and copy transactions, the processor may verify that the data to be written or copied matches the data specified in the requested write or copy transaction. The processor may additionally verify that in performing the requested transaction (or possibly other transactions as well,) security policies specified in memory 48 are not violated. In addition, processor 44 may verify that no security policy specified independently of any specific transaction request is violated.

At a violation checking step 112, the processor checks whether a violation has been detected on bus 36. As noted above, a violation may be caused either due to (i) violating a predefined policy stored in memory 48, e.g., access to a protected address or address-range, or (ii) occurrence of an event in which the at least part of transaction information intercepted on the bus differs from corresponding transaction information in the requested transaction of step 104.

When no violation has been detected at step 112, processor 44 proceeds to a transaction completion step 116, to complete the transaction, and loops back to step 104 to request a subsequent transaction from the host. The processor may complete the transaction by monitoring the bus until the host completes executing the requested transaction. Alternatively or additionally, the processor completes the transaction via the device driver of the host. For example the processor receives from the device driver data that the device driver has read from the Flash memory, a completion notification, or both.

In response to detecting a violation at step 112, processor 44 proceeds to a securing step 120, at which the processor applies a suitable protective action for preventing leakage or exposure of secret information. Example protective actions will be described below. Following step 120 the processor may loop back to step 104 to request the host to initiate a subsequent transaction with the Flash memory, over bus 36.

At step 120, processor 44 may apply various protective actions. In some embodiments, the protective action comprises resetting one or more elements of secured system 20, e.g., resetting host 24. Alternatively or additionally, the processor disrupts bus 36, for example, by modifying the logical values of one or more signals on the bus, or by disconnecting the host from the bus.

Methods for modifying bus signals are described, for example, in U.S. Application Publication 2018/0239727, whose disclosure is incorporated herein by reference. For example, in some embodiments, bus interface 40 of SLAVE1 drives one or more of the bus signals of bus 36, in parallel to host 24. SLAVE1 may disrupt the bus by applying logical values that override the logical values driven in parallel by the host. Overriding the logical values of a bus signal is implemented, for example, using a line driver stronger than the corresponding line driver of the host, or by adding a resistor in series to the bus signal driven by the host for attenuating the host-driven signal. In another embodiment, a host signal is routed to SLAVE2 via SLAVE1, which masks the logical value of the bus signal as required. Methods for disconnecting the host from the bus will be described further below.

Example Methods for Securing Transactions with a Memory Device Using Bus Monitoring The example embodiments below refer to a system configuration in which SLAVE2 comprises a memory device, e.g., a Flash memory.

Figure 3:
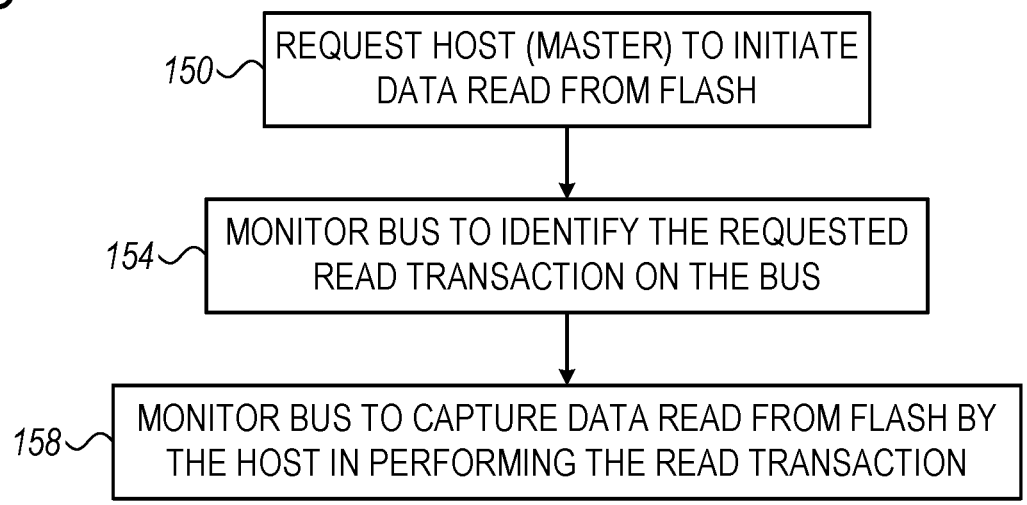
FIGS. 3 and 4 are flow charts that schematically illustrate methods for secured read and write operations, in accordance with embodiments that are described herein.
Figure 4:
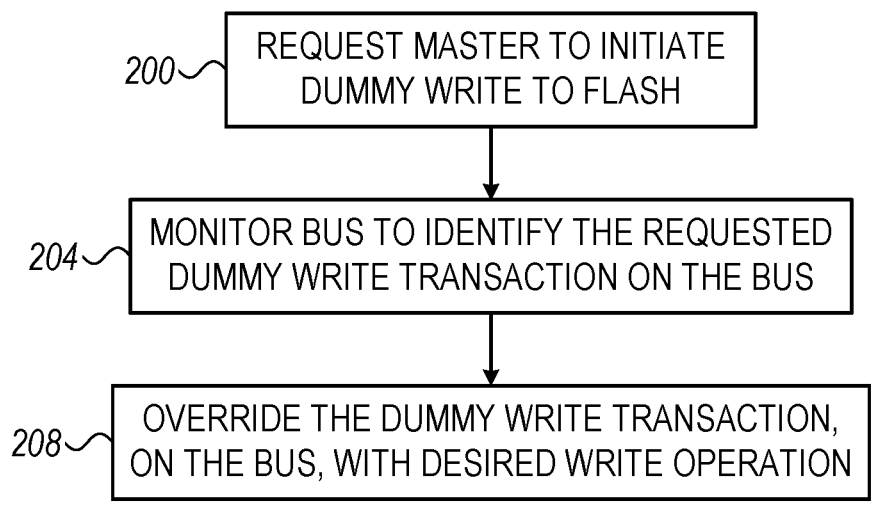

FIGS. 3 and 4 are flow charts that schematically illustrate methods for secured read and write operations, in accordance with embodiments that are described herein. The methods of FIGS. 3 and 4 are executed, for example, by processor 44 of SLAVE1. The methods of FIGS. 3 and 4 below may be combined with the method of FIG. 2 above.

The method of FIG. 3 begins, at a read transaction requesting step 150, with processor 44 requesting device driver 68 of the host, to initiate a read transaction that reads data from a given address in the Flash memory (SLAVE2). At a monitoring step 154, the processor monitors bus 36 (using IML 56) to identify the requested read transaction being executed by the device driver, as described above.

In some embodiments, the read transaction appears on the bus signals as a sequence of logical values representing the starting address for reading, followed by logical values representing one or more data units (e.g., byte units) retrieved from the Flash memory in reading one or more addresses. In an example embodiment, the processor identifies the requested read transaction on the bus, by detecting the starting address specified in the requested read transaction.

In response to identifying the read transaction on the bus, the processor continues to monitor the bus, at a monitoring step 158, for capturing the logical values on the bus representing the data being read, in parallel, by the host. The processor captures one or more data units (bytes, for example) as specified in the requested read transaction.

In some embodiments, the data retrieved from the Flash memory is signed using a cryptographic signature, in which case the processor may verify the integrity of the read data using the signature. In some embodiments, the data retrieved from the Flash memory is encrypted, in which case the processor may decrypt the read data. In some embodiments, in addition to the data captured on the bus, the processor receives a version of the read data via the device driver. In these embodiments, the processor may validate that the host was not tampered with, by comparing between the data captures directly on the bus and the data read indirectly via the device driver. Following step 158 the method of FIG. 3 terminates.

In the method of FIG. 3, SLAVE1 snoops the bus signals during a read transaction applied to the Flash memory by the host. The method of FIG. 3 can be used in a similar manner for snooping the bus signals during a write transaction applied to the Flash memory by the host. In some embodiments, by snooping the bus, SLAVE1 verifies that the requested transaction is performed as intended.

In the method of FIG. 4, processor 44 performs a desired write operation that writes desired data to a desired address in the Flash memory, without exposing to the host the written address, data or both.

The method of FIG. 4 begins, at a dummy write transaction requesting step 200, with processor 44 requesting device driver 68 to initiate a dummy write transaction to the Flash memory (SLAVE2) over bus 36. The dummy write transaction specifies an address in the Flash memory, which may be a predefined dummy address or the actual address for writing. The dummy write transaction possibly specifies an opcode, and dummy data to be written to the specified address. The dummy write transaction may appear on the bus as [opcode, dummy address, dummy data]. In this example, the dummy address follows the opcode and the dummy data follows the dummy data over time.

At a monitoring step 204, the processor monitors bus (using IML 56) to identify the requested dummy write transaction being executed by the device driver. The processor may identify the dummy write transaction on the bus, e.g., by detecting on the bus the opcode and/or dummy address specified in the requested transaction.

At an overriding step 208, the processor overrides the logical values on the bus during the dummy write transaction, with logical values representing the desired write operation. To this end, processor 44 overrides one or more of the data, address and opcode parts of the dummy write transaction with corresponding values of the desired write operation. As a result, the desired data is written to the desired address in the Flash memory. Note that the host is typically unaware of this bus overriding operation, and the data, address and opcode values of the desired write transaction remain unexposed.

In some embodiments, when overriding the bus signals as described above, processor 44 additionally monitors the bus signals driven by the bus interface. By monitoring the bus signals, processor 44 may verify that the intended data was written to the intended address, as expected.

In the method of FIG. 4, SLAVE1 overrides a dummy write transaction with a desired write transaction of different data and possibly address in the Flash memory. The method of FIG. 4 can be used in a similar manner for overriding a dummy read transaction with a desired read transaction, e.g., reading from a desired address in the Flash memory.

Figure 5:
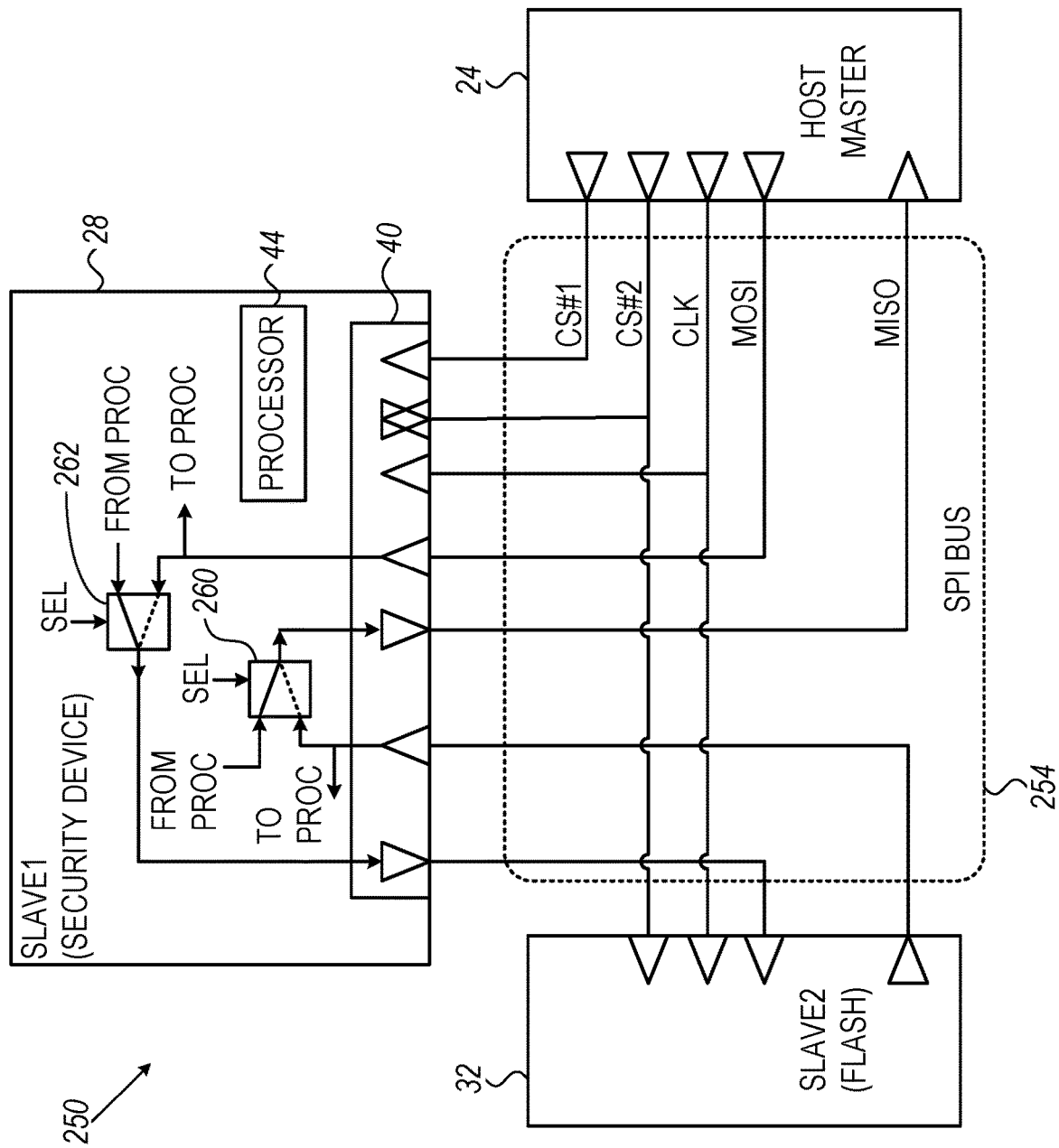
FIG. 5 is a block diagram that schematically illustrates a secured system that supports disconnecting a master device from the bus, in accordance with an embodiment that is described herein.

Methods for Secured Access to a Slave Device by Disconnecting the Host from the Bus FIG. 5 is a block diagram that schematically illustrates a secured system 250 that supports disconnecting a master device from the bus, in accordance with an embodiment that is described herein. Secured system 250 can be used in implementing secured system 20 of FIG. 1.

In secured system 250, host 24 comprises a bus master, which is connected to slave devices 28 (SLAVE1) and 32 (SLAVE2) via a SPI bus 254. The SPI bus comprises a clock (CLK) line and two data lines referred to as Master-Out Slave-In (MOSI) and Master-In Slave-Out (MISO). The CLK, MOSI and MISO lines are common to all devices (in the present example, host 24, and slave devices 28 and 32.) In addition, each slave device is selectable using a dedicated Chip-Select (CS) line. In the present example, host 24 selects SLAVE1 using a CS line denoted CS #1, and selects SLAVE2 using a CS line denoted CS #2.

Host 24, being a master, is connected to all CS lines. Each of the slave devices, on the other hand, is only connected to its own CS line. Typically, host 24 initiates a transaction by selecting the desired slave device using the respective CS line, and then communicates with the device using the CLK, MOSI and MISO lines. The MOSI line is used for transmitting from the host to the slave device, and the MISO line is used for transmitting from the slave device to the host.

SLAVE1, unlike a conventional SPI slave, is defined as a slave but is nevertheless able to drive CS lines of other devices such as CS #2 line of SLAVE2. As can be seen in FIG. 5, bus interface 40 of SLAVE1 is configured to drive the CS #2 line in parallel to host 24. When the system comprises multiple slave devices (e.g., such as SLAVE2) having respective CS lines, SLAVE1 may be configured to drive any of the CS lines in parallel to host device 24.

In FIG. 5, the MOSI and MISO lines are connected directly to SLAVE'. On the other hand, the MOSI and MISO lines are connected indirectly to SLAVE2, via SLAVE'. In this configuration, SLAVE1 controls whether the MOSI and MISO lines of the host are connected to or disconnected from SLAVE2. SLAVE1 comprises a MISO selector 260 and a MOSI selector 262. Each of MISO and MOSI selectors comprises two input ports and a single output port. At any given time, processor 44 controls the selector, using a SEL control input, to internally connect between its output port and one of its input ports. The MISO and MOSI selectors can be implemented using any suitable circuit element such as, for example, using a multiplexer element.

When host 24 reads data from SLAVE2, SLAVE1 may control the MISO selector to connect the MISO line between the host and SLAVE2, in which cases SLAVE1 may read the data on the bus in parallel to the host. Alternatively, SLAVE1 disconnects the host MISO line from SLAVE2, preventing the exposure of the data read, to the host. Processor 44 of SLAVE1 possibly injects other data to the host MISO line toward the host, instead of the data retrieved from SLAVE2.

When host 24 writes data to SLAVE2, SLAVE1 can control the MOSI selector to connect the host MOSI line to SLAVE2, thus allowing the host to write data to the slave device. Alternatively, SLAVE1 disconnects the host MOSI line from SLAVE2, using the MOSI selector, and processor 44 may inject other address and/or data to SLAVE2, executing a different write transaction.

In some embodiments, when the MISO selector connects the host MISO line to SLAVE2, SLAVE1 may intercept a host read transaction and override the data/address of the read transaction. Similarly, when the MOSI selector connects the host MOSI line to SLAVE2, SLAVE1 may intercept a host write transaction, and override the data/address of the write transaction.

Figure 6:
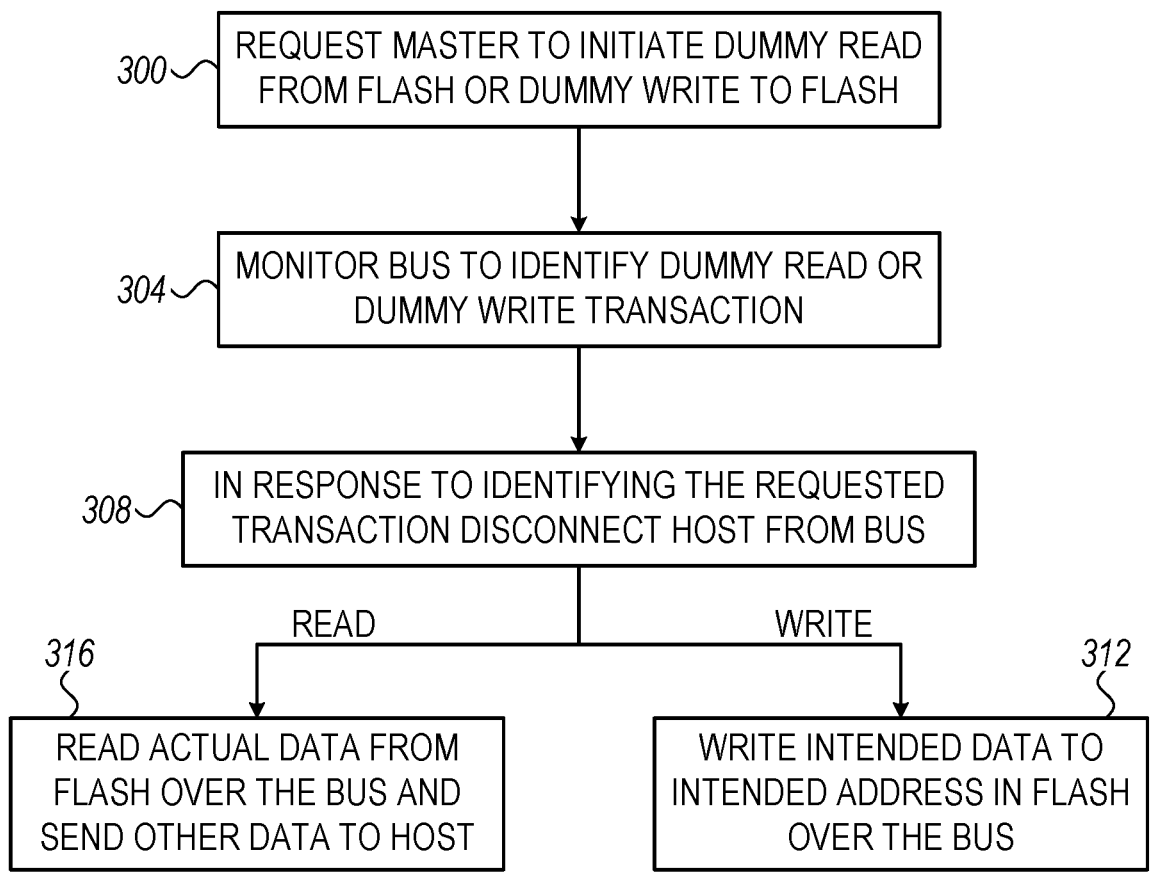
FIG. 6 is a block diagram that schematically illustrates a method for secured access to a slave device, by disconnecting the host from the bus, in accordance with an embodiment that is describe herein.

FIG. 6 is a flow chart that schematically illustrates a method for secured access to a slave device, by disconnecting the host from the bus, in accordance with an embodiment that is describe herein.

The method may be executed by processor 44 of slave device 28 (SLAVE1) in secured system 250 of FIG. 5. In the present example, SLAVE1 comprises a security device, SLAVE2 comprises a Flash memory, and bus 254 comprises a SPI bus. The method of FIG. 6 may be combined with the method of FIG. 2 above.

The method begins, at a transaction requesting step 300, with processor 44 requesting device driver 68 of host 24 to initiate a dummy write transaction or a dummy read transaction to the Flash memory. The dummy read or write transaction specifies an opcode (optional), a real or dummy address in the Flash memory and possibly real or dummy data in case of a write transaction.

At a monitoring step 304, processor 44 monitors bus (e.g., using IML 56) to identify the requested dummy write or dummy read transaction being executed by the device driver. The processor may identify the dummy write or dummy read transaction on the bus, e.g., by detecting the Flash memory address and/or the opcode specified in the requested transaction.

At a disconnecting step 308, in response to identifying the requested transaction (e.g., based on the transaction's opcode) the processor disconnects the host from the SPI bus. In case of a write transaction, the processor disconnects the host from SLAVE2 using MOSI selector 262, whereas in case of a read transaction, the processor disconnects the host using MISO selector 260. Alternatively, the processor may disconnect both the MISO and MOSI lines using both selectors, simultaneously. In some embodiments, the processor disconnects the host from the bus independently of identifying the requested transaction on the bus.

Based on the transaction detected at step 304 being a write or read transaction, the processor proceeds to a writing step 312 or to a reading step 316, respectively.

At step 312, the processor writes to the Flash memory, over the SPI bus, intended data to an intended address, regardless of any data and address delivered by the host via the MOSI line. In this technique, the processor overrides the dummy write transaction with a desired write transaction that remains hidden from the host. In some embodiments, in addition to (e.g., in parallel to) writing to the Flash memory, the processor may monitor the MOSI line driven by the host for detecting possible violation. In some embodiments, in addition to (e.g., in parallel to) writing to the Flash memory, the processor may monitor the MOSI line driven by the processor for detecting possible violation.

At step 316, the processor reads data from an intended address of the Flash memory, over the SPI bus. Because the host MISO line is disconnected from the Flash memory, the host the actual data read by the processor remains hidden from the host. In some embodiments, in addition to (e.g., in parallel to) reading from the Flash memory, the processor sends to the host other data such as dummy data.

Following each of steps 312 and 316 the method terminates.

The configuration of secured system 20 and of host device 24, slave device 28 and slave device 32 shown in FIG. 1 and secured system 250 in FIG. 5 are example configurations, which are shown purely for the sake of conceptual clarity. Alternatively, any other suitable secured system, host device and slave devices configurations can also be used. Elements that are not necessary for understanding the principles of the present invention, such as various interfaces, control circuits, addressing circuits, timing and sequencing circuits and debugging circuits, have been omitted from the figure for clarity.

In the example system configuration shown in FIGS. 1 and 5, CPU 60, slave device 28 and slave device 32 are implemented as separate Integrated Circuits (ICs). In alternative embodiments, however, at least two of the CPU, slave device 28, and slave device 32 may be integrated on separate semiconductor dies in a single Multi-Chip Package (MCP) or System on Chip (SoC), and may be interconnected by an internal bus. In an example embodiment, slave device 28 (e.g., a controller) and slave device 32 (e.g., a Flash memory) are implemented in a Multi-Chip Module (MCM). In embodiments in which slave device 28 and slave device 32 are implemented within the same package (e.g., in a MCM or MCP device,) both devices share the same SPI interface lines (e.g., MISO, MOSI and CLK) within the common package. Such embodiments provide improved security, because attacking or manipulating the signals between the two slave devices in an attempt to violate the expected functionality, requires the attacker to open the composite device.

The different elements of slave device 28 may be implemented using any suitable hardware, such as in an Application-Specific Integrated Circuit (ASIC) or Field-Programmable Gate Array (FPGA). In some embodiments, some elements of slave device 28 can be implemented using software, or using a combination of hardware and software elements. For example, in the present embodiment, slave interface logic 52 and IML 56 can be implemented as dedicated hardware modules. Memory 48 may comprise any suitable type of memory and storage technology, such as, for example, a RAM.

Typically, each of CPU 60 in host 24 and processor in slave device 28 comprises a general-purpose processor, which is programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

Secured System Comprising a Cryptographic Co-Processor

Consider an example configuration of a secured system e.g., system 20 of FIG. 1, in which host 24 connects via bus 36, as a bus master, to slave device 28 (SLAVE1) that serves as a cryptographic co-processor for host 24, and to slave device 32 (SLAVE2) that comprises a Non-Volatile Memory (NVM) device, external to both the host and the cryptographic co-processor. The cryptographic co-processor is also referred to herein as a security device.

The host runs a security application 64 that provides security services with the aid of the security device. The security application sends security commands to the security device and receives respective command responses from the security device. When serving the security application, the security device is sometimes required to access the NVM device.

The host runs dedicated device driver 68 that mediates between the security device and the external NVM device, transparently to the security application. The device driver enables the security device to access the external NVM indirectly via the device driver. Upon receiving a security command from the host, the security device executes the security command, which may require access to the NVM device, over the bus, transparently to the application program via the dedicated device driver.

In some embodiments, e.g., in executing a security command that was requested by the security application, the security device requests the host to initiate, for the security device, a transaction that accesses the external NVM over the bus. The security device monitors one or more signals on the bus, within a period during which the host accesses the NVM device over the bus in performing the requested transaction, and identifies, based on the monitored signals, whether a security violation occurred in performing the requested transaction.

The secured system configured with a cryptographic co-processor as described in this paragraph, can apply any of the embodiments described above for secured systems 20 and 250, using bus monitoring techniques.

The embodiments descried above are given by way of example, and other suitable embodiments can also be used. For example, although the embodiments described above refer mainly to the SPI bus, these embodiments are similarly applicable to the I²C bus. Further alternatively, the disclosed embodiments are not limited to a serial bus, but are similarly applicable to a parallel bus. In some embodiments, SLAVE1 is connected to the host (possibly but not necessarily as a slave) over a different bus than other slave devices such as SLAVE2. In such embodiments, SLAVE1 is also connected to the bus on which host is connected to the other slave devices such as SAVE2, to allow bus monitoring and protection, e.g., using the methods and systems described above.

In some of the embodiments described above, SLAVE1 detects a transaction by identifying opcode, address or data elements on the bus. In alternative, it may be sufficient to detect only part of such an element. For example, SLAVE1 may detect a transaction by detecting only part of an address element such as a most significant part specifying an address range.

Although the embodiments described herein mainly refer to embodiments in which an SPI bus operates in single mode, the disclosed embodiments are similarly applicable to an SPI bus operating in a double or quad mode.

Although the embodiments described herein mainly address SPI and I²C busses for connecting among devices, the methods and systems described herein can also be used with other suitable types of peripheral busses, such as, for example, the Enhanced Serial Peripheral Interface bus (eSPI).

Although in the embodiments described above SLAVE2 is mainly referred to as a Flash or NVM device, the methods and systems described herein can also be used in other applications, in which SLAVE2 may be any other suitable peripheral device, such as a volatile memory or other devices in the system. For example, SLAVE2 may comprise any suitable controller or a monitoring device.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A secured device, comprising:
an interface, configured to connect to a bus, to which a host and a second device are coupled, wherein at least the second device operates over the bus in a slave mode, and wherein the host operates on the bus as a bus master that initiates transactions on the bus, at least on behalf of the secured device; and
a processor, configured to:
request the host to initiate, for the secured device, a transaction that accesses the second device over the bus, wherein the requested transaction specifies intended transaction information;
monitor one or more signals on the bus, at least within a period during which the host accesses the second device over the bus in performing the requested transaction, including monitoring on the bus actual transaction information corresponding to the requested transaction; and
identify, based on the monitored signals, that a security violation occurred in performing the requested transaction, by detecting that at least part of the intended transaction information differs from the actual transaction information.

2. The secured device according to claim 1, wherein the processor is configured to operate on the bus in a slave mode.

3. The secured device according to claim 1, wherein the secured device is additionally coupled to the host via another bus different from the bus, and wherein the processor is configured to request the host, via the another bus, to initiate the transaction.

4. The secured device according to claim 1, wherein the requested transaction comprises one of: (i) reading data from the second device, (ii) writing data to the second device, and (iii) transferring data between first and second addresses in the second device.

5. The secured device according to claim 1, wherein the processor is configured to detect that at least one element selected from a list comprising an opcode element, an address element and a data element, is different between the intended transaction information and the actual transaction information.

6. The secured device according to claim 1, wherein the processor is configured to identify the security violation by detecting that a predefined security policy has been violated on the bus, during or outside the period of the requested transaction.

7. The secured device according to claim 1, wherein the requested transaction comprises reading data from the second device, and wherein the processor is configured to snoop on the bus, data read from the second device, by the host, over the bus.

8. The secured device according to claim 1, wherein in response to identifying the security violation, the processor is configured to perform a protective action that prevents exposing or modifying data that appears on the bus in accessing the second device.

9. The secured device according to claim 1, wherein both the secured device and the second device are implemented in a common package, and are interconnected via the bus within the common package.

10. A secured device, comprising:
an interface, configured to connect to a bus, to which a host and a second device are coupled, wherein at least the second device operates over the bus in a slave mode, and wherein the host operates on the bus as a bus master that initiates transactions on the bus, at least on behalf of the secured device; and
a processor, which is configured to:
request the host to initiate a first read or write operation to that accesses the second device; and
at least within a period during which the host accesses the second device over the bus in performing the requested first read or write operation, apply to the second device a second different read or write operation that overrides the first read or write operation applied by the host.

11. The secured device according to claim 10, wherein the processor is configured to apply the second different read or write operation to the second device, by overriding logical values of one or more signals on the bus during execution of the first read or write operation by the host.

12. The secured device according to claim 10, wherein the processor is configured to apply the second different read or write operation by disconnecting a signal of the bus connecting between the host and the second device, and accessing the second device over the bus, instead of the host.

13. A method, comprising:
in a secured device that connects to a bus to which a host and a second device are coupled, wherein at least the second device operates over the bus in a slave mode, and wherein the host operates on the bus as a bus master that initiates transactions on the bus, at least on behalf of the secured device, requesting the host, by the secured device, to initiate for the secured device a transaction that accesses the second device over the bus, wherein the requested transaction specifies intended transaction information;

monitoring one or more signals on the bus, at least within a period during which the host accesses the second device over the bus in performing the requested transaction, including monitoring on the bus actual transaction information corresponding to the requested transaction; and identifying, based on the monitored signals, a security violation occurred in performing the requested transaction, by detectinq that at least part of the intended transaction information differs from the actual transaction information.

14. The method according to claim 13, wherein the secured device operates on the bus in a slave mode.

15. The method according to claim 13, wherein the secured device is additionally coupled to the host via another bus different from the bus, and wherein the secured device is configured to request the host, via the another bus, to initiate the transaction.

16. The method according to claim 13, wherein the requested transaction comprises one of: (i) reading data from the second device, (ii) writing data to the second device, and (iii) transferring data between first and second addresses in the second device.

17. The method according to claim 13, wherein identifying the security violation comprises detecting that at least one element selected from a list comprising an opcode element, an address element and a data element, is different between the intended transaction information and the actual transaction information.

18. The method according to claim 13, wherein identifying the security violation comprises detecting that a predefined security policy has been violated on the bus, during or outside the period of the requested transaction.

19. The method according to claim 13, wherein the requested transaction comprises reading data from the second device, and comprising snooping on the bus, data read from the second device, by the host, over the bus.

20. The method according to claim 13, and comprising, in response to identifying the security violation, performing a protective action that prevents exposing or modifying data that appears on the bus in accessing the second device.

21. The method according to claim 13, wherein both the secured device and the second device are implemented in a common package, and are interconnected via the bus within the common package.

22. A method, comprising:
in a secured device that connects to a bus to which a host and a second device are coupled, wherein at least the second device operates over the bus in a slave mode, and wherein the host operates on the bus as a bus master that initiates transactions on the bus, at least on behalf of the secured device, requesting the host to initiate a first read or write operation that accesses the second device; and at least within a period during which the host accesses the second device over the bus in performing the requested first read or write operation, applying to the second device a second different read or write operation that overrides the first read or write operation applied by the host.

23. The method according to claim 22, wherein applying the second different read or write operation to the second device comprises overriding logical values of one or more signals on the bus during execution of the first read operation by the host.

24. The method according to claim 22, wherein applying the second different read or write operation comprises disconnecting a signal of the bus connecting between the host and the second device, and accessing the second device over the bus, instead of the host.

25. A secured system, comprising:
a host coupled to a bus, configured to operate as a bus master, and to access slave devices coupled to the bus by arbitrating between bus access operations triggered by the slave devices and by the host; and a secured device coupled to the bus, and is configured to:
request the host to initiate a transaction that accesses a second device coupled to the bus as a slave, wherein the requested transaction specifies intended transaction information;

monitor one or more signals on the bus, at least within a period during which the host accesses the second device over the bus in performing the requested transaction, including monitoring on the bus actual transaction information corresponding to the requested transaction; and identify, based on the monitored signals, that a security violation occurred in performing the requested transaction, by detecting that at least part of the intended transaction information differs from the actual transaction information.

26. The secured system according to claim 25, wherein the secured device is configured to operate on the bus in a slave mode.

27. The secured system according to claim 25, wherein the secured device is additionally coupled to the host via another bus different from the bus, and wherein the secured device is configured to request the host, via the another bus, to initiate the transaction.

28. The secured system according to claim 25, wherein the requested transaction comprises reading data from the second device, and wherein the secured device is configured to snoop on the bus, data read from the second device, by the host, over the bus.

29. The secured system according to claim 25, wherein in response to identifying the security violation, the secured device is configured to perform a protective action that prevents exposing or modifying data that appears on the bus in accessing the second device.

* * * * *